UNITED STATES PATENT OFFICE.

JOHN MATTHEWS, OF NEW YORK, N. Y.

IMPROVEMENT IN FLAVORING AERATED BEVERAGES.

Specification forming part of Letters Patent No. 189,764, dated April 17, 1877; application filed April 4, 1877.

*To all whom it may concern:*

Be it known that I, JOHN MATTHEWS, of New York city, in the county of New York and State of New York, have invented certain new and useful Improvements in Flavoring Aerated Beverages; and I do hereby declare that the following is a full, clear, and exact description thereof, which will enable others skilled in the art to which it appertains to make and use the same.

The object of this invention is to economize the essential oils or essences used in flavoring beverages, to increase the usual amount of flavoring present in the beverages, and to secure a more limpid or transparent beverage than can be attained in the usual methods, and to secure a uniform amount of flavoring essences in aerated or carbonated beverages, such as soda-water, lemonade, ginger-ale, root-beer, sarsaparilla, mead, sherbet, and other similar carbonated beverages which are put up in bottles or in fountains.

It is usual, in dispensing or bottling aerated beverages, to charge the simple water in the fountain with carbonic-acid gas, and to add to each bottle or fountain from one to two ounces of sirup flavored with essential oils. It is, however, difficult to unite enough essential oil with so small a portion of sirup to sufficiently flavor the bottle or sweetened portion of beverage dispensed, as many essential oils, although to some extent soluble in water or aqueous solutions of sugar, require a larger portion of water to effect the solution than is contained in the sirup used. Cutting the essential oil with alcohol before mixing it with the sirup frequently renders the sirup turbid, and, moreover, the essential oils separate from the sirup, if permitted to stand at rest. In flavoring the beverage, too large a portion of essential oil is sometimes accidentally added to the beverage, owing to the separated oils flowing into the bottle or drinking-tumbler in a state more or less mixed with sirup. I obviate these difficulties by adding the essential oils to the water to be carbonated before carbonating them, and sweeten the beverage thus flavored with simple sirup, or sirup otherwise prepared. The advantage thus gained is, that the carbonated beverage thus flavored, but not sweetened, does not inconveniently foam in bottling or dispensing, and the carbonated beverage may be bottled, so as to be of high flavor, and, at the same time, clear. This is particularly desirable in the case of beverages flavored with the oil of lemon, which, if sufficiently flavored, are invariably turbid.

In manufacturing lemon soda-water, I add one and a half dram of the oil of lemon to twenty gallons of the water previous to carbonating it, either in the carbonating apparatus, or previous to introducing it, or introduce it by injecting it into the fountain after the liquid is submitted to pressure.

The agitation of the liquid in the fountain to mix it with the gas assists the incorporation of the essential oil. I bottle this flavored water, adding to each bottle a portion of sirup composed of a solution of sugar and water, standing about 30° Baumé, and acidulated with about one-half ounce of citric acid to the gallon, so that the flavored water will be of the flavor and acidity of good lemonade.

For sarsaparilla soda-water, I use about the same quantity of the essential oil of winter-green, or of a mixture of winter-green, sassafras, and anise, and sometimes other oils, and bottle the flavored water, adding to each bottle a portion of the simple sirup colored with caramel, to suit the eye of the customer. A slight excess of the essential oils thus added to the water to be carbonated is not important, as the excess of the oils speedily separates, leaving the water comparatively clear. In the case of the heavy oils, as oil of winter-green, they will remain on the bottom of the carbonating-vessel, and may be drawn into a receiver and again used.

In the case of lighter oils, the bottling is discontinued before the oils are drawn down to the discharge tube, which, in fountains provided with water-gages, is easily determined.

Having thus described my invention, what I claim, and desire to secure by Letters Patent of the United States, is—

The process herein described for flavoring carbonated beverages, which consists in charging the carbonated liquid with the essential oils, and then adding the sirup to sweeten them when bottled or otherwise drawn off, substantially as set forth.

In testimony that I claim the foregoing as my own I affix my signature in presence of two witnesses.

JOHN MATTHEWS.

Witnesses:
JOHN HUGHES,
JOHN D. WILSON.